(12) United States Patent
Vasseur et al.

(10) Patent No.: US 7,428,213 B2
(45) Date of Patent: Sep. 23, 2008

(54) METHOD AND APPARATUS FOR DETERMINING NETWORK ROUTING INFORMATION BASED ON SHARED RISK LINK GROUP INFORMATION

(75) Inventors: Jean Philippe Vasseur, Dunstable, MA (US); Stefano B. Previdi, Wavre (BE); Clarence Filsfils, Brussels (BE); David Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 774 days.

(21) Appl. No.: 10/719,003

(22) Filed: Nov. 21, 2003

(65) Prior Publication Data

US 2005/0111349 A1 May 26, 2005

(51) Int. Cl.
*H04L 12/26* (2006.01)
(52) U.S. Cl. .................. 370/228; 370/238; 370/242; 370/248; 370/256
(58) Field of Classification Search ......... 370/216–228, 370/238, 242, 254, 255
See application file for complete search history.

(56) References Cited

U.S. PATENT DOCUMENTS

| | | | |
|---|---|---|---|
| 4,827,411 A * | 5/1989 | Arrowood et al. ........... 707/206 |
| 5,243,592 A | 9/1993 | Perlman et al. |
| 5,253,248 A | 10/1993 | Dravida et al. |
| 5,999,286 A | 12/1999 | Venkatesan |
| 6,032,194 A | 2/2000 | Gai et al. |
| 6,128,750 A | 10/2000 | Espy et al. |
| 6,256,295 B1 | 7/2001 | Callon |
| 6,278,687 B1 | 8/2001 | Hunneyball |
| 6,377,542 B1 | 4/2002 | Asprey |
| 6,535,481 B1 | 3/2003 | Andersson et al. |
| 6,578,084 B1 | 6/2003 | Moberg et al. |
| 6,578,086 B1 * | 6/2003 | Regan et al. ................ 709/242 |
| 6,590,868 B2 | 7/2003 | Shen |
| 6,636,498 B1 | 10/2003 | Leung |

(Continued)

OTHER PUBLICATIONS

International Searching Authority, International Search Report, PCT/US04/33827, dated Mar. 28, 2005, 8 pages.

(Continued)

*Primary Examiner*—Ricky Ngo
*Assistant Examiner*—Gary Mui
(74) *Attorney, Agent, or Firm*—Hickman Palermo Truong & Becker LLP

(57) ABSTRACT

A method and apparatus are disclosed for performing a shortest path first network routing path determination in a data communications network based in part on information about links that are associated as shared risk link groups. Microloops are avoided in computing shortest path first trees by considering whether links are within shared risk link groups. In a first approach, for each link state packet in a link state database, listed adjacencies are removed if the link between the node originating the LSP and the reported adjacency belongs to a shared risk link group for which one component (local link) is known as down, and a shortest path first computation is then performed. In a second approach, during the SPT computation and after having added a first node to a path, each neighboring node is added to a tentative tree if and only if, a link between the first node and the neighboring node does not belong to a shared risk link group for which one component (local link) is known as down.

20 Claims, 8 Drawing Sheets

U.S. PATENT DOCUMENTS

| | | | |
|---|---|---|---|
| 6,668,282 | B1 | 12/2003 | Booth et al. |
| 6,697,325 | B1* | 2/2004 | Cain ........................... 370/217 |
| 6,711,125 | B1 | 3/2004 | Walrand et al. |
| 6,882,627 | B2* | 4/2005 | Pieda et al. ................. 370/248 |
| 6,944,131 | B2* | 9/2005 | Beshai et al. ............ 370/238.1 |
| 6,982,951 | B2* | 1/2006 | Doverspike et al. ......... 370/217 |
| 7,099,286 | B1* | 8/2006 | Swallow ..................... 370/255 |
| 7,113,481 | B2* | 9/2006 | Elie-Dit-Cosaque et al. ........................... 370/238 |
| 2002/0012318 | A1* | 1/2002 | Moriya et al. ............... 370/225 |
| 2002/0093954 | A1 | 7/2002 | Weil et al. |
| 2002/0112072 | A1* | 8/2002 | Jain ........................... 709/239 |
| 2002/0116669 | A1* | 8/2002 | Jain ............................. 714/43 |
| 2003/0147352 | A1* | 8/2003 | Ishibashi et al. ............ 370/248 |
| 2004/0085894 | A1* | 5/2004 | Wang et al. ................. 370/216 |
| 2005/0031339 | A1* | 2/2005 | Qiao et al. ..................... 398/4 |
| 2007/0011284 | A1* | 1/2007 | Le Roux et al. ............. 709/223 |

OTHER PUBLICATIONS

Current Claims, PCT/US04/33827, 6 pages.
Wang, Zheng et al., "Shortest Path First with Emergency Exits," ACM 089791-405-8/90/0009/0166, 1990, pp. 166-176.
M. Watari, "Masafumi Watari's Web Site," "Papers" page, printed May 7, 2003, http://www.sfc.wide.ad.jp/~watari/papers.html, 1 page.
C. Perkins, "IP Mobility Support for IPv4," Jan. 2002, IETF Network Working Group Request for Comments 3220 (RFC 322), from www.ietf.org, pp. 1-98.
S. Deering, et al., "Internet Protocol, Version 6 (IPv6), Specification," Dec. 1998, IETF Network Working Group Request for Comments 2460, from www.ietf.org, pp. 1-39.
University of Southern California, Information Sciences Institute, "Internet Protocol, DARPA Internet Program, Protocol Specification," Sep. 1981 (IETF RFC 791), 48 pages.
D. Johnson, et al., "Mobility Support in Ipv6, draft-ietf-mobileip-ipv6-21.txt," Feb. 26, 2003, http://www.ietf.org/html.charters/mobileip-charter.html, pp. 1-169.
Ryuji Wakikawa, et al., "Mobility Related Research at InternetCAR Project," http://www.connectathon.org/talks03/cthon-keio.pdf, Mar. 5, 2003, 12 pages.
William Stallings, "Mobile IP," http://www.cisco.com/warp/public/ipi_4-2_ip.html, 11 pages.
Cisco Systems, Inc., "White Paper, *Cisco Mobile IP*, Executive Summary," 2002, http://www.cisco.com/warp/public/cc/pd/10sw/prodlit/mbxul_wp.htm, 8 pages.
Cisco Systems, Inc., "Configuring Mobile IP," http://www.cisco.com/warp/public/732/Tech/mobile/IP/techdocument, 2003, 38 pages.
Mikkel Thorup, "Fortifying OSPF/IS-IS against link-failure," Sep. 7, 2001, pp. 1-10.
Fei Dai et al., "On Independently Finding Converging Paths in Internet," 2001, pp. 1-13.
Paolo Narváez et al., "Local Restoration Algorithm for Link-State Routing Protocols," 1998, 6 pages.
Jie Wu et al., "An Extended Fault-Tolerant Link-State Routing Protocol in the Internet," 2001, 7 pages.
Paolo Narváez et al., "Fault-Tolerant Routing in the Internet without Flooding," 1998, pp. 1-13.
Takuya Yoshihiro, "Design and Analysis of Routing Algorithms toward the Next Generation Internet," Dec. 2002, 98 pages.
Fortz, Bernard, et al., "Optimizing OSPF/IS-IS Weights in a Changing World," IEEE JSAC Special Issue on Advances in Fundamentals of Network Management, Spring 2002, pp. 1-31.
Thorup, Mikkel, et al., "Avoiding Ties in Shortest Path First Routing," AT&T Labs-Research, Shannon Laboratory, Florham Park, NJ, pp. 1-13.
Thorup, Mikkel, "OSPF Areas Considered Harmful," AT&T Labs-Research, Florham Park, NJ, Apr. 22, 2003, pp. 1-9.
M. Leelanivas, et al., "Graceful Restart Mechanism for Label Distribution Protocol," Feb. 2003, Network Working Group, Request for Comments: 3478, http://rfc3478.x42.com, data retrieved Apr. 28, 2004, pp. 1-11.
R. Balay, et al., "IS-IS Mesh Groups," Oct. 2000, Network Working Group, Request for Comments: 2973, pp. 1-8.
M. Shand, et al., Restart signaling for IS-IS, draft-ietf-isis-restart-05.txt, Jan. 2004, Network Working Group, Internet Draft, http://www.ietf.org/internet-drafts/draft-ietf-isis-restart-05.txt, data retrieved Apr. 28, 2004, pp. 1-20.
Amir Hermelin, et al., "Extending the Number of IS-IS LSP Fragments Beyond the 256 Limit, draft-ietf-isis-lsp-frags-02.txt," Network Working Group, Internet Draft, http://www.ietf.org/internet-drafts/draft-ietf-isis-ext-lsp-frags-02.txt, data retrieved Apr. 28, 2004, pp. 1-12.
M. Shand, et al., "Restart signaling for IS-IS, draft-ietf-isis-restart-04.txt," Jul. 2003, Network Working Group, Internet Draft, http://vesuvio.ipv6.tilab.com/internet-drafts/draft-ietf-isis-restart-04.txt, data retrieved Apr. 28, 2004, pp. 1-18.
U.S. Appl. No. 10/442,589, filed May 20, 2003, Stewart Frederick Bryant, et al., entitled "A Method and Apparatus for Constructing a Transition Route in a Data Communication Network," 45 pages.
U.S. Appl. No. 10/340,371, filed Jan. 9, 2003, Kevin George Miles, et al., entitled Method and Apparatus for Constructing a Backup Route in a Data Communications Network, 33 pages.
Cisco Systems, Inc., "Tunnel ToS," Cisco IOS Release 12.0(17)S, 12.0(17)ST, 12.2(8)T, and 12.2(14)S, Jan. 28, 2003, pp. 1-15.
Cisco Systems, Inc., "AppleTalk, IP, and Novell IPX Overview," Sep. 9, 2002, pp. IV-1-IV-6.
Cisco Systems, Inc., "Why Are OSPF Neighbors Stuck in Exstart/Exchange State?," 1992-2003, 8 pages.
Cisco Systems, Inc., "Trace," Chapter 32, Sep. 13, 2002, pp. 32-1-32-12.
U.S. Appl. No. 10/323,358, filed Dec. 17, 2002, Ian Michael Charles Shand, entitled "Method and Apparatus for Advertising a Link Cost in a Data Communications Network," 29 pages.
Office Action from China for foreign patent application 200480033399.8 dated Feb. 29, 2008 (4 pgs) with English Translation (4 pgs).
Current claims in China patent application 200480033399.8 (3 pgs) with marked up copy (4 pgs).

* cited by examiner

METHOD AND APPARATUS FOR DETERMINING NETWORK ROUTING INFORMATION BASED ON SHARED RISK LINK GROUP INFORMATION

FIELD OF THE INVENTION

The present invention generally relates to routing data in a network. The invention relates more specifically to a method and apparatus for determining network routing information based on shared risk link group information.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of links (communication paths such as telephone or optical lines) and nodes (usually routers directing the packet along one or more of a plurality of links connected to it) according to one of various routing protocols.

In the network, some nodes represent end systems (such as printers, fax machines, telephones, PC's etc) whereas other nodes represent network devices (e.g. switches, routers etc). The data packets are sent around the network from a source to a destination in accordance for example with routing information shared among the nodes of the network. As the network comprises a plurality of interconnected nodes, the network is fairly robust. Should a node or link fail for any reason, the network dynamically configures to re-route data so as to avoid the failed node. When a node or link comes into existence on a network, for instance through repair or by addition of a new node, the network dynamically converges to a so-called converged state wherein all the routers of the network have common routing information.

One class of routing protocol relying on shared information is the link state protocol. Examples of link state protocols are the Intermediate System-to-Intermediate System (IS-IS) protocol and the Open Shortest Path First (OSPF) protocol. A link state protocol relies on a routing algorithm resident at each node. Each node on the network advertises, throughout the network, links to neighboring nodes and provides a cost associated with each link that can be based on any appropriate metric such as link bandwidth or delay and is typically expressed as an integer value. A link may have an asymmetric cost, that is, the cost in the direction AB along a link may be different from the cost in a direction BA.

Based on the advertised information in the form of a link state packet (LSP), each node constructs a link state database (LSDB), which is a map of the entire network topology, and from that constructs generally a single optimum route to each available node. A link can be thought of as an interface on a router. The state of the link is a description of that interface and of its relationship to its neighboring routers. A description of the interface may include, for example, the IP address of the interface, the mask, the type of network it is connected to, the router connected to that network and so on. The collection of all link states for the whole network forms the link-state database.

Link state protocols use a link state algorithm to build and calculate the shortest path to all known destinations. The algorithms for determining a shortest path are complicated but the following provides a simplified view of the steps of a link state algorithm. Upon initialization or due to any changing routing information, a router generates a link state advertisement packet (LSP). This advertisement represents the collection of all link states on that router. All routers exchange LSPs by means of flooding. Each router that receives a link state update stores a copy in its link state database and then rapidly propagates the update to other routers. After the database of each router is completed, each router calculates the shortest (lowest cost) path to all designations and uses this information to form an IP routing table. In some instances two or more routers of equal cost present themselves, termed an "equal cost path split." One appropriate algorithm is a shortest path first (SPF) algorithm.

As a result, a "spanning tree" is constructed, rooted at the node and showing an optimum path including intermediate nodes to each available destination node. Conversely, a "reverse spanning tree" can be constructed showing the optimum path to a given node from all nodes from which it is reachable. Because each node has a common LSDB (other than when advertised changes are propagating around the network) any node is able to compute the spanning and reverse spanning tree rooted at any other node. The results of the SPF are stored in a routing table (also known as a routing information base (RIB)) and, based on these results, the forwarding information base (FIB) or forwarding table is updated to control forwarding of packets appropriately.

In link state protocols, when a link or a node fails and is subsequently repaired, or there is some other change to the network such as a change of link cost, the routers involved with the repaired part of the network then have to re-establish convergence. This is achieved by the router(s) advertising themselves or the change throughout the network area. However, during topology change, there is a short period of time in which LSDBs, RIBs and FIBs across a network become inconsistent as information about a change is propagated through the network. Routes generated during this period of inconsistency may result in routing loops, which persist until the databases have converged, at which point there should be no loops, by definition.

As an example, if a first node sends a packet to a destination node via a second node, comprising the optimum route according to the first node's SPF, a situation can arise where the second node, according to its SPF (based on a different LSDB from that of the first node) determines that the best route to the destination node is via the first node and sends the packet back. The loop can happen where the first node, according to its LSDB believes that a link cost is lower than the second node does, according to its LSDB. This can continue indefinitely although usually the packet will have a maximum hop count after which it will be discarded. Such a loop can be a direct loop between two nodes or an indirect loop around a circuit of nodes. Re-convergence will typically take several hundred milliseconds and hence may cause disruption for periods greater than that originally caused by the failure.

Further, the increase of bandwidth demand in IP networks has led to the deployment of IP over wave division multiplexing (WDM) network infrastructure. In WDM networks, data from different sources may be communicated over the same fiber optic link at the same time, using different wavelengths of light for each data source. Because the Greek letter $\lambda$(lambda) is traditionally used to denote wavelength in mathematical expressions, different data sources on a WDM link are sometimes termed "lambdas." In WDM networks, routers may be interconnected with one or several lambdas provided by the optical layer. Further, dense WDM (DWDM) technology currently allows the multiplexing and de-multiplexing of 16 or more wavelengths within a particular color spectrum, i.e., tens of lambdas.

Since different equipment is typically used to form an IP network and an optical network, common practice in such networks is that different pairs of interconnected routers have a set of lambdas that share a common optical network element. The set of lambdas is termed a Shared Risk Link Group or SRLG to indicate that the failure of the common component can affect multiple resources. For example, a fiber cut would provoke the failure of all lambdas traversing the failed fiber; all the lambdas traversing the fiber would share a common SRLG.

To address convergence problems arising from the use of SRLGs, extensions to the Interior Gateway Protocol (IGP) haven been defined in the context of GMPLS to distribute SRLG. Such extensions are defined in the IETF draft documents entitled "draft-ietf-isis-gmpls-extensions-16.txt" and "draft-ietf-ccamp-ospf-gmpls-extensions-09.txt," which are currently available at the website of the IETF, at ietf.org. However, existing link state protocols do not make use of this information in their shortest path computation. As a result, a failure of an SRLG may lead to an increase in the time required for router convergence, or may require routers to use non-optimal paths during the period of time in which the SRLG failure is not yet known by every router and those routers have not converged.

Based on the foregoing, there is a clear need for an improved method of determining routing paths that uses information about shared risk link groups.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
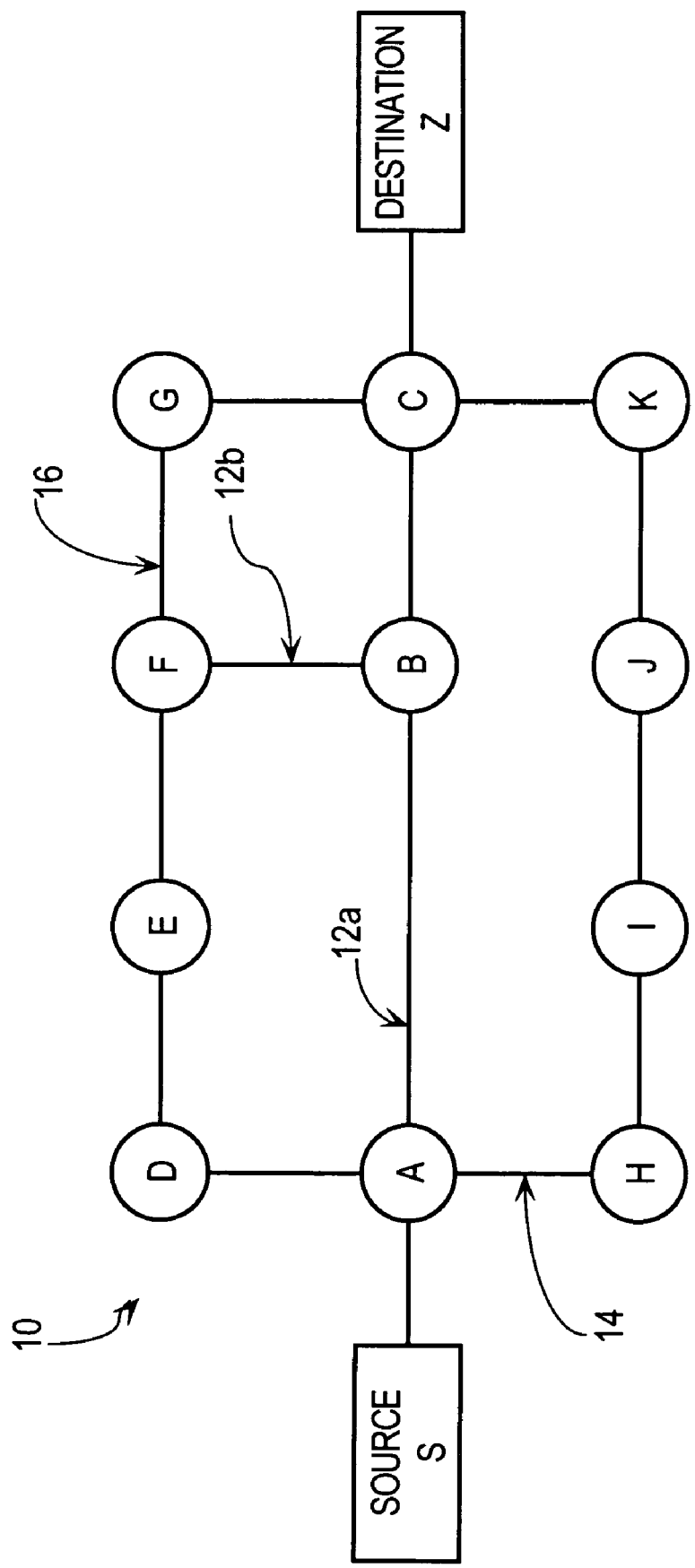
FIG. 1A is a simplified block diagram of a first hypothetical network.

A method and apparatus for determining network routing information based on shared risk link group information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Structural and Functional Overview
    2.1 Use of Link State Databases
    2.2 Determining a Shortest Path Without Information About Shared Risk Link Groups
  3.0 Method For Determining Routing Information Based on Shared Risk Link Group Information
  4.0 Implementation Mechanisms-Hardware Overview
  5.0 Extensions and Alternatives 1.0 General Overview The needs identified in the foregoing Background, and other needs and objects that will become apparent for the following description, are achieved in the present invention, which comprises, in one aspect, a method for determining network routing information based on shared risk link group information.

A method and apparatus are disclosed for performing a shortest path first network routing path determination in a data communications network based in part on information about links that are associated as shared risk link groups. Micro-loops are avoided in computing shortest path first trees by considering whether links are within shared risk link groups.

In a first approach, for each link state packet in a link state database, listed adjacencies are removed if the link between the node originating the LSP and the reported adjacency belongs to a shared risk link group for which at least one component (a local link) is known as down, and a shortest path first computation is then performed.

In a second approach, during the SPT computation and after having added a first node to a path, each neighboring node is added to a tentative tree if and only if, a link between the first node and the neighboring node does not belong to a shared risk link group for which at least one component (a local link) is known as down.

In either approach, a graph verification step may be performed using a graph representing nodes and links in the network. If the graph is disconnected, then the SPF determination is repeated without pruning any link not explicitly reported as down. Further a timer mechanism may be used to trigger re-performing an SPF computation after a time interval in which new LSPs may have been received.

In other aspects, the invention encompasses a computer apparatus and a computer-readable medium configured to carry out the foregoing steps.

The method described herein can be implemented according to any appropriate routing protocol. Generally link state protocols such as Intermediate System to Intermediate System (IS-IS) or Open Shortest Path First (OSPF) are appropriate protocols.

2.0 Structural and Functional Background
  2.1 Use of Link State Databases

A data communications network comprises a plurality of interconnected sites. Traffic between sites is routed from the source to a destination via nodes of the network. Due to various factors (for instance excessive network traffic, hardware failure or software failure), nodes may enter a failure mode, during which time data routed to that node is not routed onwards by that node.

In addition to failure mode, a network change can take place when a link cost is increased or decreased, for example as a result of a network administrator intervention and in any of these cases the possibility arises that temporary de-synchronization of the network as the change is propagated through the network can give rise to loops. Other possible network changes comprise introduction of a new router (effectively corresponding to a link cost decrease from "infinity") or removal of a router (effectively corresponding to a link cost increase to "infinity").

FIG. 1A is an illustrative network diagram showing an example of a data communications network having as network elements nodes and links, which can be the internet or a sub-network such as a routing domain or a virtual network. The network as depicted in FIG. IA comprises nodes A, B, C, D, E, F, G, H, I, J, K, each of which is a router. Lines in FIG. 1A represent links among nodes. Assume that all the links are SRLG diverse, meaning that they do not share any SRLG, except that links 12a, 12b, which respectively connect nodes A-B and F-B, both belong to SRLG 1. As an example, assume that links 12a, 12b both traverse the same optical fiber.

Each router in the network includes software that enables a router to maintain a network map in the form of a link state database (LSDB). The LSDB is updated whenever an area of the network topology changes. If a router has interfaces on multiple areas, an LSDB is maintained for each separate area. The LSDB is calculated periodically. If no changes have occurred to the area's topology, no changes are made to the area's LSDB.

The LSDB contains entries for all the networks to which each router in an area is connected. It also assigns an outgoing cost metric to each network interface of a router. This metric measures the cost of sending traffic through an interface to the connected network. By assigning costs, router preferences can be set based on line cost, line speed or any other parameters. Assume that the link costs of all links in FIG. 1A are equal to 1, except that the cost of the A-H link 14 is 2, and the cost of the F-G link 16 is given by a variable c.

The entries in the LSDB are based on information sent in Link State Packets (LSPs), which include information generated by a router to describe the reachability of the router. Each LSP contains information identifying the interfaces on the router, the attached nodes or networks for that router and the costs to reach each of these nodes or networks. A network is considered converged when the LSDB is the same for all routers in the area.

After the LSDB has reached the converged state, each router calculates the shortest path through the network for each node or network, and each router. A Shortest Path First (SPF) Tree (SPT) is calculated and the information stored. Each router maintains its own SPT. After the SPT is built, a routing table is calculated by determining the lowest-cost route for each destination node or network. Routing tables are calculated locally at each router and the FIB updated accordingly. The network of FIG. 1A results in a LSDB as shown in Table 1 below:

TABLE 1

| Router | Attached Node or Network | Network Usage Cost |
|---|---|---|
| A | D | 1 |
| A | H | 2 |
| B | A | 1 |
| B | C | 1 |
| B | F | 1 |
| C | B | 1 |
| C | G | 1 |
| C | K | 1 |
| D | A | 1 |
| D | E | 1 |

TABLE 1-continued

| Router | Attached Node or Network | Network Usage Cost |
|---|---|---|
| E | D | 1 |
| E | F | 1 |
| F | B | 1 |
| F | E | 1 |
| F | G | c |
| G | C | 1 |
| G | F | c |
| H | A | 2 |
| H | I | 1 |
| I | H | 1 |
| I | J | 1 |
| J | I | 1 |
| J | K | 1 |
| K | C | 1 |
| K | J | 1 |

Figure 1B:
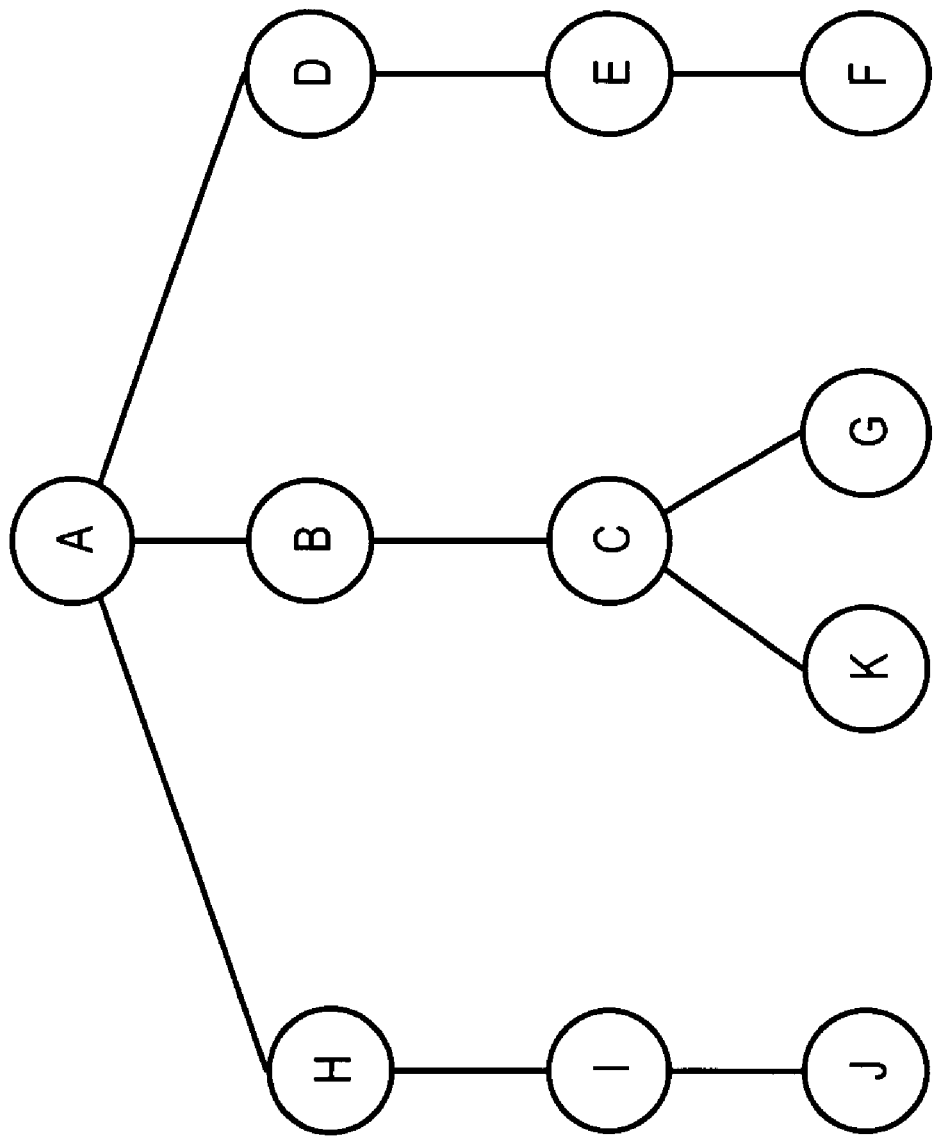
FIG. 1B shows a Shortest Path First Tree (SPT) for router A of the network of FIG. 1A.

Using this LSDB, each router calculates the SPT. FIG. 1B shows a SPT for router A of FIG. 1A. This shows the shortest path from router A for each network and each router. The router A can then calculate the A routing table from this SPT.

2.2 Determining a Shortest Path Without Information About Shared Risk Link Groups In conventional practice, SPF computations are performed without use of information about shared risk link groups. Consequently, such computations are subject to the unintended introduction of loops into the routing tables, with undesirable results, as illustrated in the following two examples.

For both examples, assume that lsp-gen(X) is the period of time a node X waits before originating a new LSP when its LSP changes, and spf-trig(X) is the period of time that a node X waits after a new LSP has been received to trigger an SPF. Both the functions lsp-gen and spf-trig may be a linear, quadratic, exponential, or other function of the number of LSP generations and SPF occurrences. Both examples address a hypothetical path followed by packets from a source S shown in FIG. 1A, which is directly attached to the node A, to a destination Z, which is directly attached to node C. P(A,Z) yields the next hop along the shortest path computed by the node A for the packet targeted to Z. For instance, at a steady state with no link failures, for the network of FIG. 1A, P(A, Z)=B. The shortest path from A to Z is A-B-C, and therefore the next hop from A to reach Z is B.

In conventional link state protocol approaches, the following process would occur in the event of a fiber cut that provokes the failure of SRLG 1. As a first case, assume that c=10, that is, the cost of the F-G link 16 is 10. At time T0, SRLG 1 fails, and thus links A-B and B-F simultaneously fail. At time T1, nodes A and F detect the link failures; typically such detection occurs almost at the same time.

In response, at time T2, nodes A and F each determine a new next hop node by computing lsp-gen(A) and lsp-gen(F), which are determined by the IGP parameters setting, and then originate a new LSP.

At time T3, nodes A and F each perform a new SPF computation, as spf-trig(A) and spf-trig(F). A and F converge, such that P(A,Z)=D. This result occurs because the shortest path from A to C is A-D-E-F-B-C, because A is unaware of the failure of the link B-F. Further, P(F,Z)=E, because the shortest path from F to C is F-E-D-A-H-I-J-K-C. At this point, a micro-loop A-D-A has been formed, because P(D,Z)=A and because the shortest path is D-A-B-C. Further, A has computed a shortest path that includes a failed link.

At time T4, node D receives the LSP of A and converges with a result of P(D,Z)=E, based on a shortest path of D-E-F-B-C, because D is not aware that the link B-F has failed. Therefore, another micro-loop A-D-E-F-E-D-A is formed.

At time T5, node E receives the LSP of F and converges with a result of P(E,Z)=D, forming a micro-loop A-D-E-D-A. At time T6, D receives the LSP of F and converges with a result of P(D,Z)=A, forming a micro-loop A-D-A. At time T7, A receives the LSP of F and converges with a result of P(A,C)=H.

In this example, several different timing sequences could occur depending on LSP propagation and queueing delays between nodes, the then-current values of lsp-gen and spf-gen, processor loads on the routers, and other factors. Further, the preceding discussion identifies only some of all potential micro-loops that may occur. The example shows, however, that undesirable loops are an inevitable result of performing SPF calculations without knowledge of concurrent failures of links that are associated in shared risk link groups.

Consider a second example, in which the link cost c of the link F-G is 5. Assume that at time T0, SRLG 1 fails, and therefore links A-B and B-F simultaneously fail. At time T1, the link failures are detected by A and F, typically at nearly the same time. At time T2, A and F determine lsp-gen(A) and lsp-gen(B), respectively, as determined by the IGP parameters, and then originate new LSPs. At time T3, after computing spf-trig(A) and spf-trig(F), A and F converge with the result that P(A,Z)=D and P(F,Z)=G, based on a shortest path of F-G-C. At this point, the micro-loop A-D-A has been formed.

At time T4, node D receives the LSP of A and converges with the result that P(D,Z)=E. At this stage, the micro-loop has disappeared.

At time T5, node E receives the LSP of F and converges with the result of P(E,Z)=F. Thus, the path is unchanged. However, the path followed by packets from A to C is non-optimal, because they follow the path A-D-E-F-G-C with a total cost of 9, even though the shortest path is A-H-I-J-K-C with a cost of 6.

At time T6, D receives the LSP of F and converges with the result that P(D,Z)=A. Consequently, a micro-loop A-D-A is formed. At time T7, A receives the LSP of F and converges with the result that P(A,C)=H.

3.0 Method of Determining Routing Information Based on Shared Risk Link Group Information The foregoing two examples clearly highlight the need to consider SRLG information when determining a SPT in response to an SRLG failure. One approach to address this problem could be to prune all the links that belong to a common SRLG, as part of computing a SPT. However, this approach has the potential drawback of computing a non-optimal path if the failure involves a single link failure rather than the failure of a SRLG. The present approach addresses this issue by performing an additional SPF computation after a timer has elapsed, as described below.

According to an embodiment, a shortest path first process is performed that uses shared risk link group information as part of computing a shortest path first tree. Using the techniques herein, if an SRLG fails, convergence time is reduced, which is critical in networks that require fast IGP convergence and which have multiple SRLGs. Further, using the techniques herein, a more optimal route is selected.

Figure 2A:
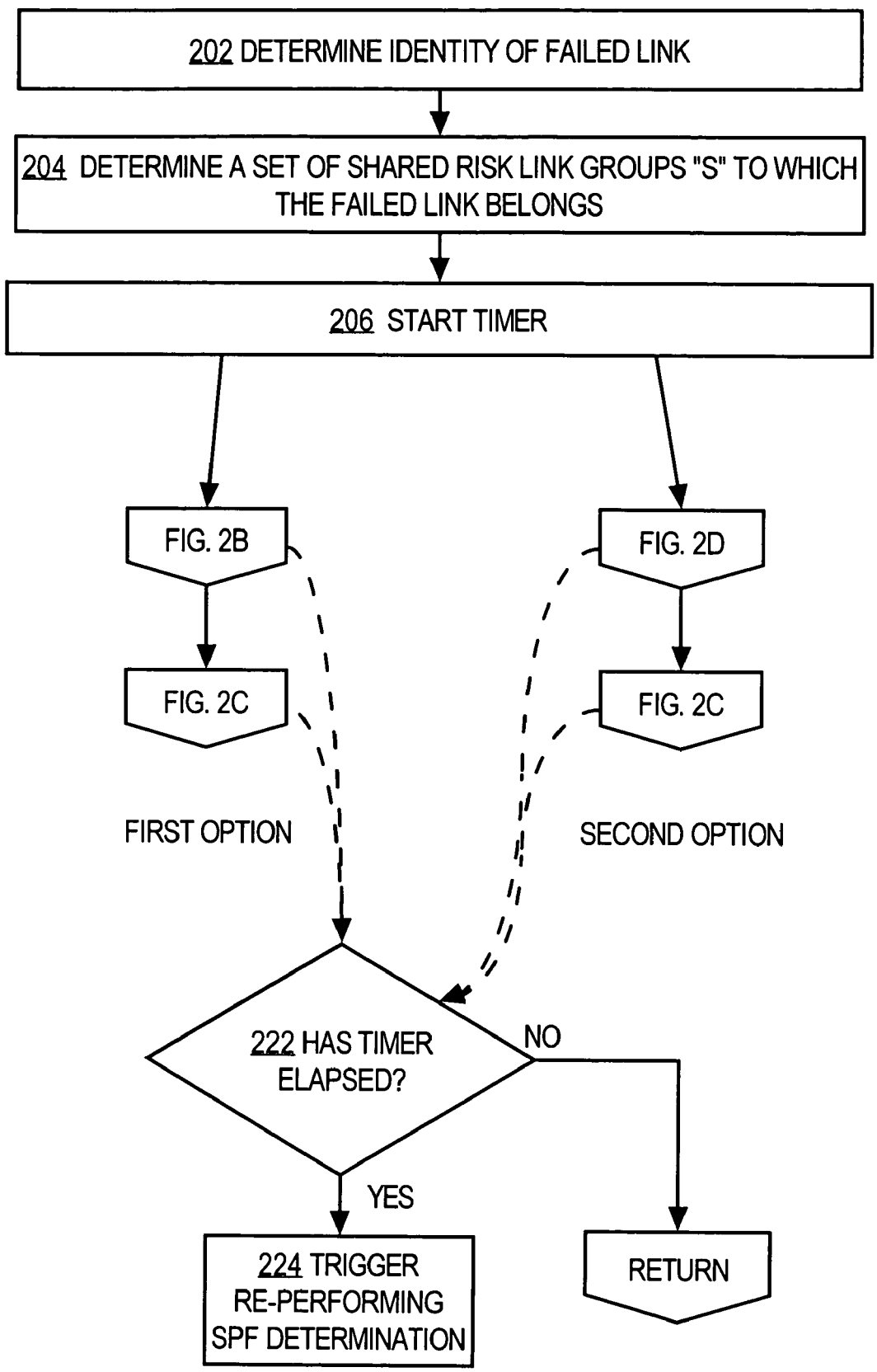
FIG. 2A is a flow diagram of a process of determining network routing information based on shared risk link group information.
Figure 2B:
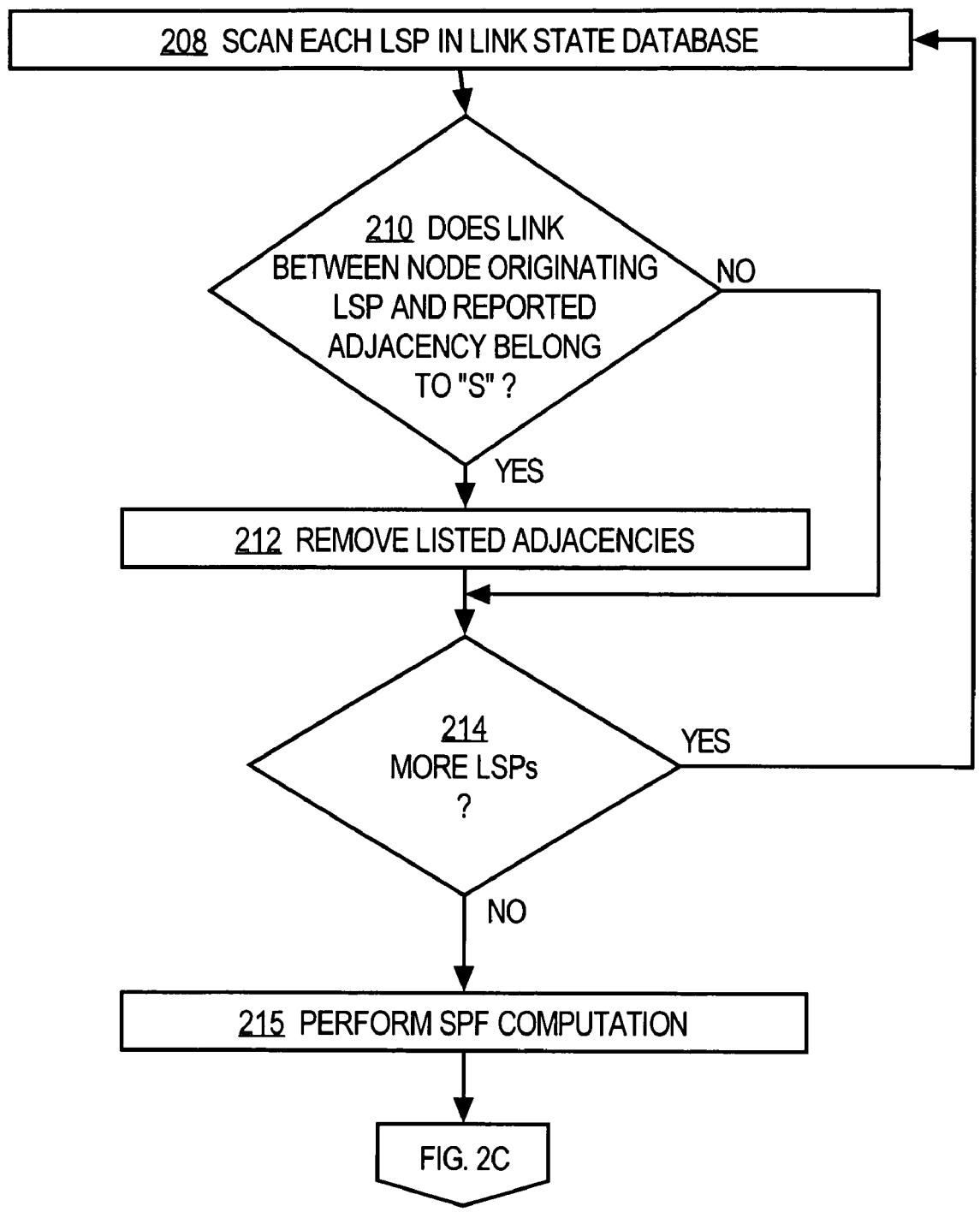
FIG. 2B is a flow diagram of further steps in a first alternative of the process of FIG. 2A.
Figure 2C:
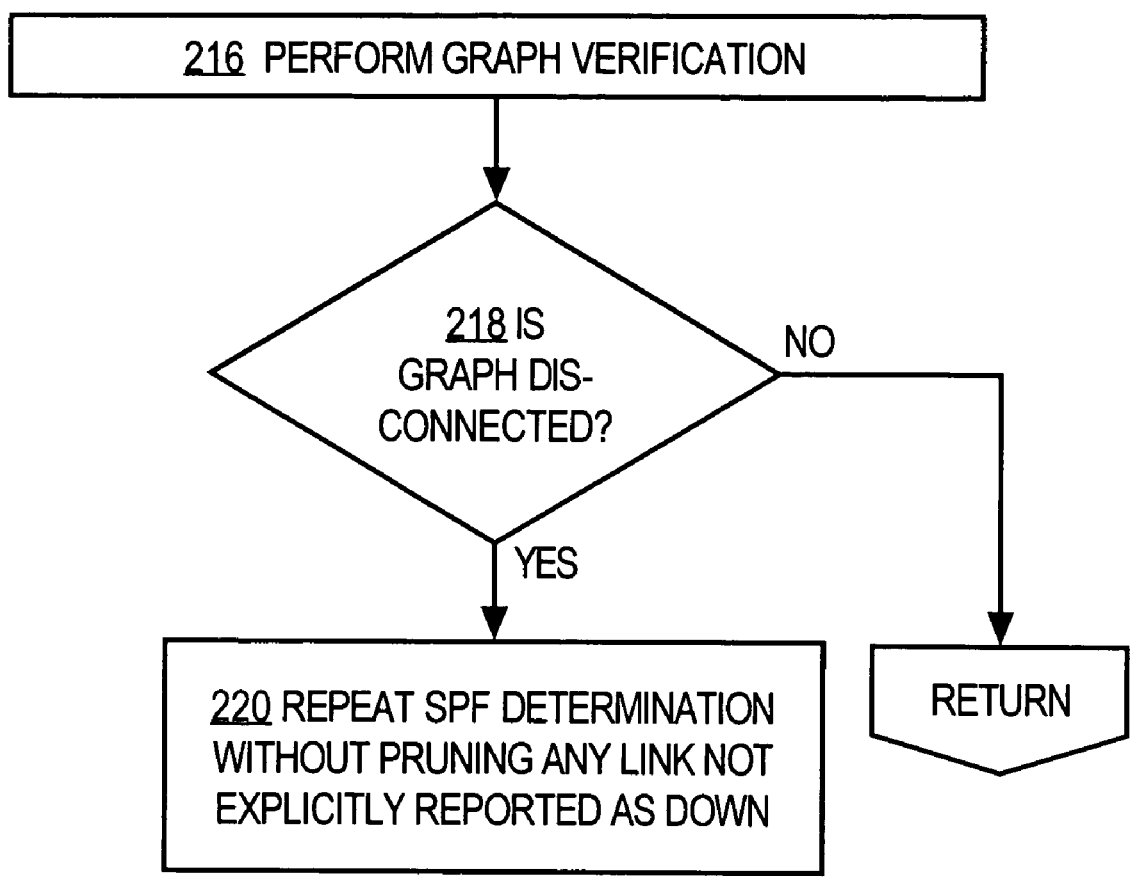
FIG. 2C is a flow diagram of graph verification steps performed first either a first alternative or a second alternative of the process of FIG. 2A.

FIG. 2A is a flow diagram of a process of performing a shortest path first determination based in part on information about shared risk link groups in a network. FIG. 2B is a flow diagram of further steps in the process of FIG. 2A. FIG. 2C is a flow diagram of steps performed upon expiration of a timer used in the process of FIG. 2A.

Referring first to FIG. 2A, the illustrated process generally is performed when an SPF determination is triggered, which typically occurs within a router in response to failure of a link local to that router, or receipt by that router of a new LSP. In block 202, the identity of the failed link is determined. For example, link identity information in the LSP may be used, or the router may locally determine the identity of a failed link. In block 204, a set of shared risk link groups S, to which the failed link belongs, is determined. The set S is determined based on the SRLG membership information that has been flooded in the IGP extensions. Hence, when a link fails, the router can determine all the links that have at least one SRLG in common with the failed link, and the set of links is represented as S in this description. For instance, suppose that link L1 is advertised with SRLG 1, 2, the link L2 belongs to SRLG 1, link L3 belongs to SRLG 3, and link L4 belongs to SRLG 1. All such links may be connected to different routers. If the link L1 fails on router R1, then R1 knows that it must exclude all the links that belong to S where S=L1, L2 and L4.

In block 206, a timer is initiated. The use of the timer for triggering other steps is described further below. A typical period for the timer is a few seconds, or the time required to receive any other potential LSPs. In an embodiment, the period of the timer is configurable.

Figure 2D:
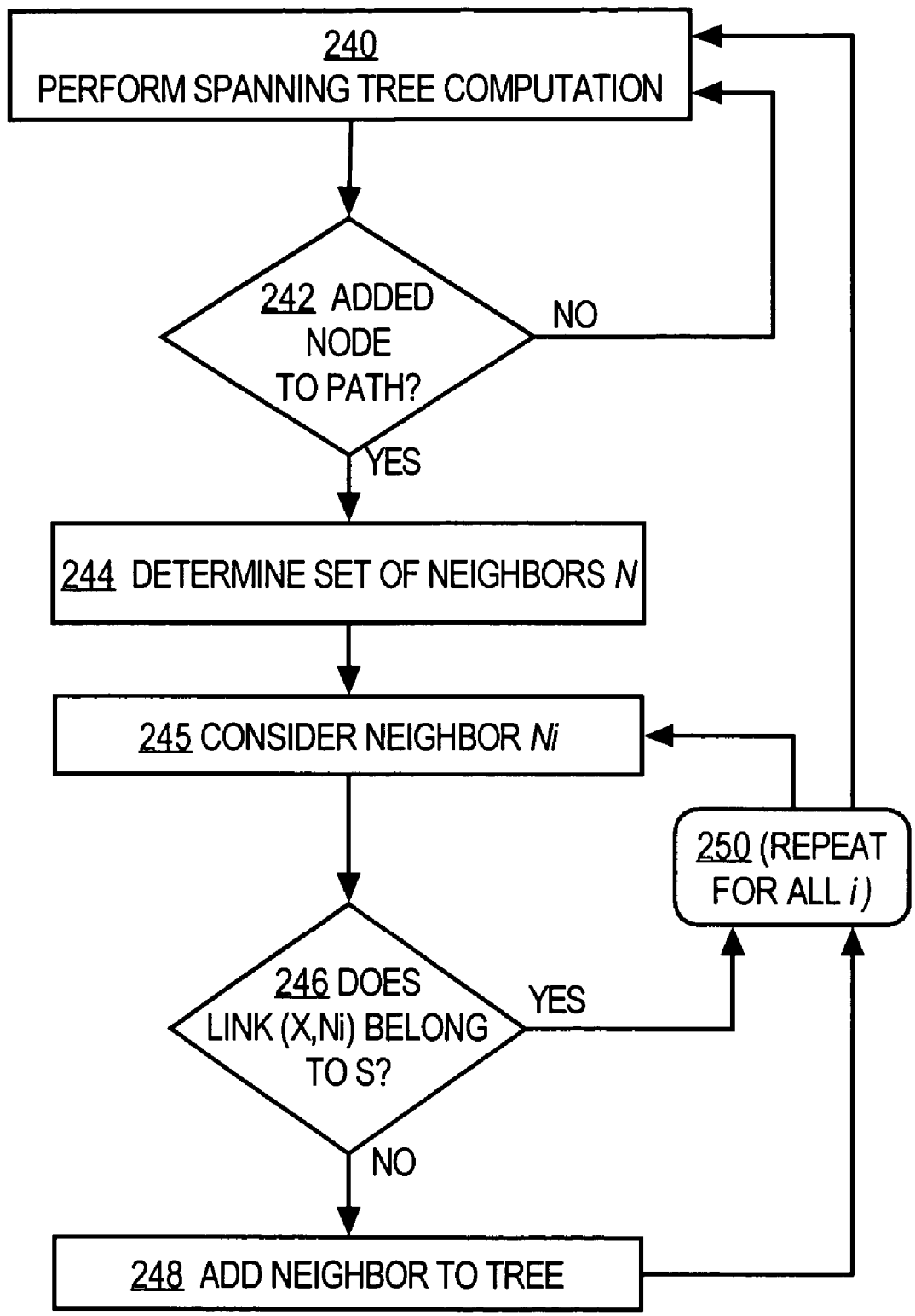
FIG. 2D is a flow diagram of further steps in a second alternative of the process of FIG. 2A.

After block 206, the process of FIG. 2A may proceed according to either of two alternatives or options, either of which is equally effective in performing a shortest path first determination based in part on information about shared risk link groups. A first alternative is represented by FIG. 2B, FIG. 2C; a second alternative is represented by FIG. 2D, FIG. 2C.

Referring first to FIG. 2B, in the first alternative, in block 208, each LSP in the link state database is scanned or reviewed. In block 210, a test is performed to determine whether the set S includes a link between a node that originated the then-current LSP and an adjacency reported in the LSP. If not, then control passes to block 214, which forms a loop with block 208 to scan each LSP in the LSDB. If the set S does include the link, then the listed adjacency is removed from the LSDB, as indicated by block 212. This step has the effect of removing, from the LSDB, each link associated in the SRLG S with a link that was reported as failed. Thereafter, as shown in block 215, an SPF computation is performed based on the modified LSDB.

An implementation can reduce processing time for performing block 208-215 by pre-computing the set S for each link, prior to any failure, and for each link the set of links that may simultaneously fail, e.g., making use of a linked list or a tree, and then perform a shortest path first tree computation.

When all LSPs in the LDSB have been processed and an SPF has been computed as shown in block 215, control passes to FIG. 2C.

Referring now to FIG. 2C, in block 216 a graph verification step is performed, to determine whether a graph that is created based on the resulting modified LDSB is a disconnected graph. A disconnected graph is a graph in which one or more child nodes no longer have a parent node. If the graph is disconnected, as tested in block 218, then in block 220 a new SPF is determined, but without pruning, as part of block 210 and block 212, any link that was not explicitly reported as failed in an LSP.

Figure 3:
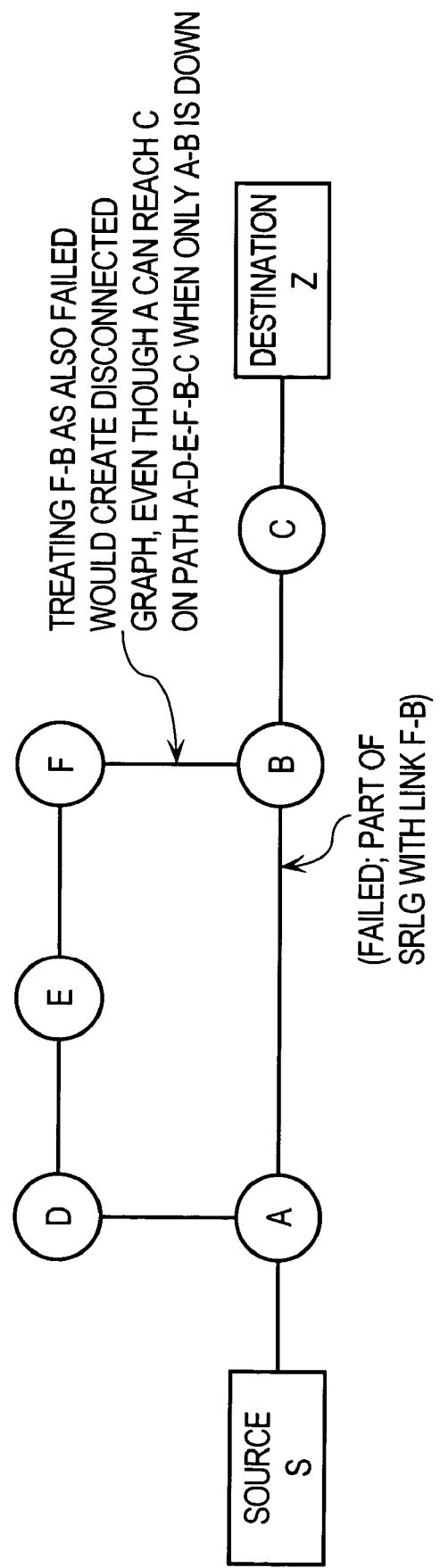
FIG. 3 is a simplified block diagram of a second hypothetical network.

The process of FIG. 2C enables handling certain situations in which a link has failed, but an associated SRLG has not failed. An example of such a situation is now described with reference to FIG. 3, which is a simplified block diagram of a second hypothetical network. The network of FIG. 3 is similar in topology to FIG. 1A, except that the path A-H-I-J-K and the path F-G-C do not exist. Assume that link A-B fails on router B due to a local interface failure, and not due to a SRLG failure. Performing the process of FIG. 2A, FIG. 2B without also using the process of FIG. 2C would result in creating a disconnected graph based on the erroneous assumption that an SRLG failure had occurred, because link B-F would be considered unavailable as part of a SRLG with link A-B, even though an available path A-D-E-F-B-C exists between A and C. Incorporating the process of FIG. 2C avoids such a result, at the cost of slightly increased convergence time. However, the foregoing situation is expected to arise relatively infrequently, because network topology normally is designed to survive to the failure of a single SRLG. Nevertheless, the process of FIG. 2C may be considered optional and may be omitted if it is found to significantly increase the level of processing complexity during computation of an SPT.

Referring now to FIG. 2D, a second alternative process is shown. In block 240, a shortest path first tree computation is performed according to any of several known algorithms. In block 242, a test is performed to determine if a node has been added to a PATH. For convenience, in the following description such a node is referred to as node X. If so, then in block 244, a set of neighbors N for node X is determined.

In block 245, a neighbor Ni in the set of neighbors N is considered. In block 246, a test is performed to determine if the network link (X, Ni) is in the set of shared risk link groups S. If not, and only if not, then the current neighbor Ni is added to the tentative shortest first path tree TENT, as indicated by block 248. In block 250, steps 245, 246, 248 are repeated for all neighbors Ni in N. Thereafter control proceeds to FIG. 2C and the graph verification steps described above are performed.

Thus, during the SPT computation but after having added a node X to PATH, each of the neighbors Ni of X are added to TENT if and only if the link (X,Ni) does not belong to S.

At any time during either the first option or second option, the timer that was started in step 206 (FIG. 2A) may elapse. Referring again to FIG. 2A, once the timer has elapsed, as tested in block 222, a new SPF computation is triggered, as shown in block 224. Performing a new SPF computation is carried out to ensure that if a simple link failure occurs that would have been considered as an SRLG failure, the more optimal path is recomputed.

As an example, referring again to FIG. 1A, assume that link A-B fails due to a local interface failure. Without performing the process of FIG. 2C, the selected path from A to C is A-H-I-J-K-C, with a cost of 6. If the process of FIG. 2C is performed, then the selected path is A-D-E-F-B-C, with a cost of 5.

The foregoing techniques result in more rapid convergence of link state databases by routers in a network that may experience failure of links that are associated in shared risk link groups. Although the foregoing techniques require additional processing as compared to past approaches, the vast majority of network link failures have been found to have been provoked by SRLG failure. As a result, any drawbacks associated with the techniques herein are outweighed by the benefits achieved by the improvements in convergence and finding optimal paths in the case of an SRLG failure.

To avoid potential micro-loops that could result from non-coherent decisions performed by different routers, all routers in a network may execute the processes described herein. In an embodiment, the availability of these processes within a router may be announced and activated if and only if all routers in the network support the processes.

4.0 Implementation Mechanisms—Hardware Overview

Figure 4:
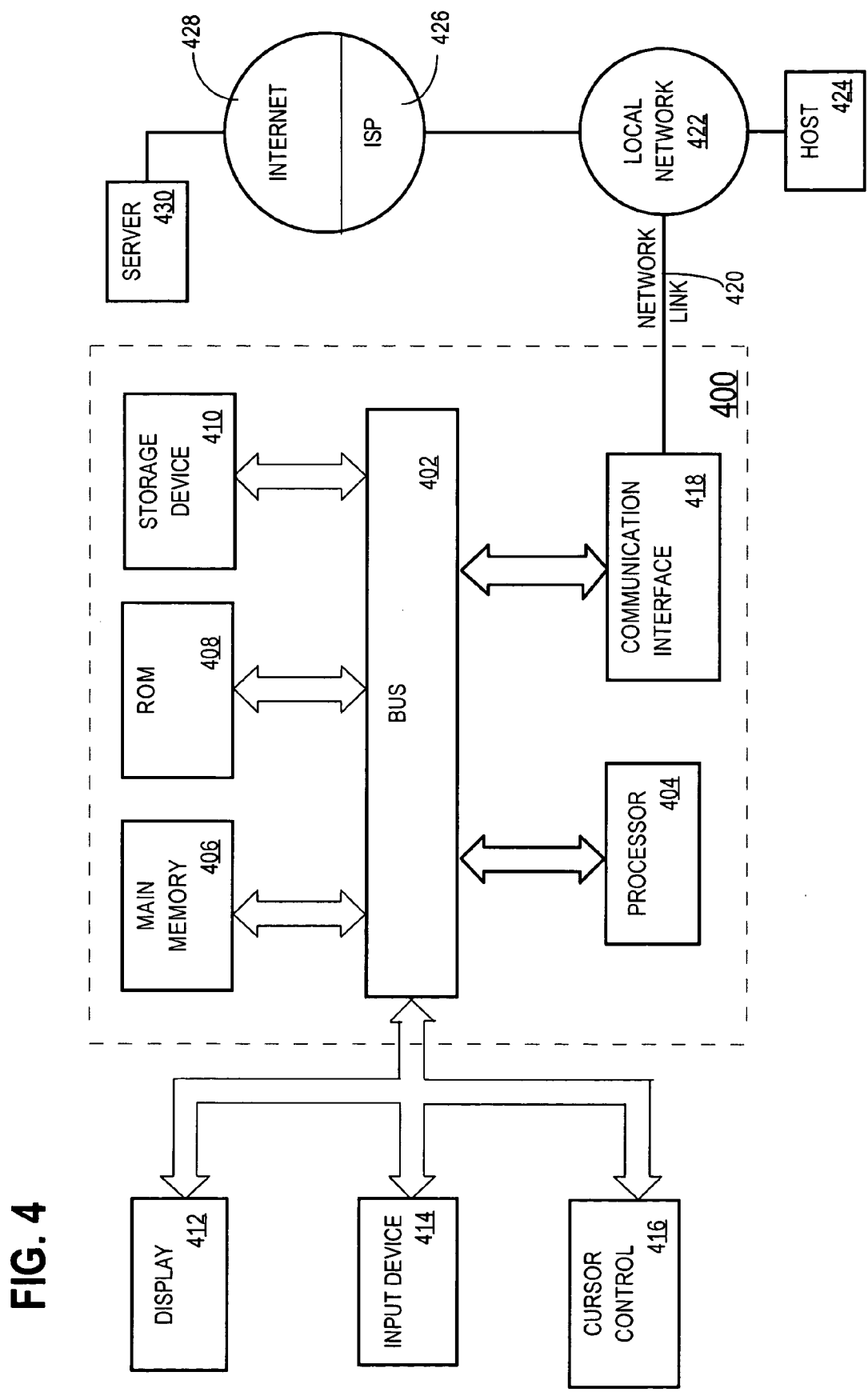
FIG. 4 is a block diagram that illustrates a computer system upon which an embodiment may be implemented.

FIG. 4 is a block diagram that illustrates a computer system 400 upon which the method may be implemented. The method is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 418. Firmware or software running in the computer system 400 provides a terminal interface or character-based command interface so that external commands can be given to the computer system.

A switching system 416 is coupled to bus 402 and has an input interface and a respective output interface (commonly designated 419) to external network elements. The external network elements may include a plurality of additional routers 160 or a local network coupled to one or more hosts or routers, or a global network such as the Internet having one or more servers. The switching system 416 switches information traffic arriving on the input interface to output interface 419 according to pre-determined protocols and conventions that are well known. For example, switching system 416, in cooperation with processor 404, can determine a destination of a packet of data arriving on the input interface and send it to the correct destination using the output interface. The destinations may include a host, server, other end stations, or other routing and switching devices in a local network or Internet.

The computer system 400 implements as a router acting as a node the above described method generating routing information. The implementation is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Interface 419 also provides a two-way data communication coupling to a network link that is connected to a local network. For example, the interface 419 may be an integrated services digital network (ISDN) card or a modem to provide a data communication connection to a corresponding type of telephone line. As another example, the interface 419 may be a local area network (LAN) card to provide a data communication connection to a compatible LAN. Wireless links may also be implemented. In any such implementation, the interface 419 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 419, which carry the digital data to and from computer system 400, are exemplary forms of carrier waves transporting the information.

Computer system 400 can send messages and receive data, including program code, through the network(s), network link and interface 419. In the Internet example, a server might transmit a requested code for an application program through the Internet, ISP, local network and communication interface 418. One such downloaded application provides for the method as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism can be adopted to implement the invention. The method steps set out can be carried out in any appropriate order and aspects from the examples and embodiments described juxtaposed or interchanged as appropriate. Any appropriate routing protocol can be used, such as Intermediate System—Intermediate System (IS-IS) or Open Shortest Path First (OSPF). Similarly any appropriate network can provide the platform for implementation of the method.

What is claimed is:

1. A method of determining network routing information based on shared risk link group information in a data communications network comprising nodes and links, the method comprising the computer-implemented steps of:

receiving information identifying a failed link in the network;

receiving information defining one or more shared risk link groups to which the failed link belongs, each of the one or more shared risk link groups logically comprising two or more links, one of the two or more links being the failed link, and each link in a shared risk link group sharing a physical resource whose failure risks affecting all of the links in the shared risk link group;

accessing a link state database that stores information defining one or more links and adjacent nodes;

determining whether each link defined in the link state database is in the one or more shared risk link groups; and removing an adjacent node from the link state database for a link other than the failed link that is determined to be in one of the shared risk link groups.

2. A method as recited in claim 1, performed as part of determining a shortest path through the network from a source to a destination.

3. A method as recited in claim 1, further comprising the steps of:

determining whether a graph of the data communications network based on the link state database is disconnected; and if the graph is disconnected, then determining a new shortest path through the network to a destination network element without removing any link that has not been explicitly reported by another network element as failed.

4. A method according to any of claim 1, 2, or 3, further comprising the steps of:

initiating a timer prior to the accessing step;

when the timer expires, determining a new shortest path through the network to a destination network element.

5. A method of determining network routing information based on shared risk link group information in a data communications network comprising nodes and links, the method comprising the steps of:
- receiving information identifying a failed link in the network;
- receiving information defining one or more shared risk link groups to which the failed link belongs,
- each of the one or more shared risk link groups logically comprising two or more links, one of the two or more links being the failed link, and each link in a shared risk link group sharing a physical resource whose failure risks affecting all of the links in the shared risk link group;
- determining the set of links S logically comprising all links belonging to the one or more shared risk links groups to which the failed link belongs;
- during computation of a shortest path first tree, after having added a node X to a path, adding each neighbor Ni of node X to a tentative tree if and only if a link (X, Ni) does not belong to S.

6. A method of determining network routing information based on shared risk link group information in a data communications network comprising nodes and links, the method comprising the steps of:
- receiving information identifying a failed link in the network;
- receiving information defining one or more shared risk link groups to which the failed link belongs,
- each of the one or more shared risk link groups logically comprising two or more links, one of the two or more links being the failed link, and each link in a shared risk link group sharing a physical resource whose failure risks affecting all of the links in the shared risk link group;
- initiating computation of a shortest path first tree;
- adding a first node to a path as part of the computation;
- determining a set of neighbors of the first node; and
- adding each neighbor node to a tentative tree if and only if a link between the first node and the neighbor node does not belong to one of the shared risk link groups.

7. A method as recited in claim 6, further comprising the steps of:
- determining whether a graph representing the data communications network is disconnected; and
- if the graph is disconnected, then determining a new shortest path through the network to a destination network element without removing any link that has not been explicitly reported by another network element as failed.

8. A method according to any of claim 6 or 7, further comprising the steps of:
- initiating a timer prior to the accessing step;
- when the timer expires, determining a new shortest path through the network to a destination network element.

9. A computer readable storage medium storing one or more sequences of computer executable instructions for determining network routing information based on shared risk link group information in a data communications network comprising nodes and links in a data communications network having as elements links and nodes, which instructions, when executed by one or more processors, cause the one or more processors to perform
- receiving information identifying a failed link in the network;
- receiving information defining one or more shared risk link groups to which the failed link belongs,
- each of the one or more shared risk link groups logically comprising two or more links, one of the two or more links being the failed link, and each link in a shared risk link group sharing a physical resource whose failure risks affecting all of the links in the shared risk link group;
- accessing a link state database that stores information defining one or more links and adjacent nodes;
- determining whether each link defined in the link state database is in the one or more shared risk link groups; and
- removing an adjacent node from the link state database for a link other than the failed link that is determined to be in one of the shared risk link groups.

10. A computer readable storage medium storing one or more sequences of computer executable instructions for determining network routing information based on shared risk link group information in a data communications network comprising nodes and links in a data communications network having as elements links and nodes, which instructions, when executed by one or more processors, cause the one or more processors to perform
- receiving information identifying a failed link in the network;
- receiving information defining one or more shared risk link groups to which the failed link belongs,
- each of the one or more shared risk link groups logically comprising two or more links, one of the two or more links being the failed link, and each link in a shared risk link group sharing a physical resource whose failure risks affecting all of the links in the shared risk link group;
- determining the set of links S logically comprising all links belonging to the one or more shared risk links groups to which the failed link belongs;
- during computation of a shortest path first tree, after having added a node X to a path, adding each neighbor Ni of node X to a tentative tree if and only if a link (X, Ni) does not belong to S.

11. An apparatus for generating routing information based on shared risk link group information in a data communications network having as elements nodes and links, comprising:
- means for receiving information identifying a failed link in the network;
- means for receiving information defining one or more shared risk link groups to which the failed link belongs,
- each of the one or more shared risk link groups logically comprising two or more links, one of the two or more links being the failed link, and each link in a shared risk link group sharing a physical resource whose failure risks affecting all of the links in the shared risk link group;
- means for accessing a link state database that stores information defining one or more links and adjacent nodes;
- means for determining whether each link defined in the link state database is in the one or more shared risk link groups; and
- means for removing an adjacent node from the link state database for a link other than the failed link that is determined to be in one of the shared risk link groups.

12. An apparatus as recited in claim 11, implemented as part of a means for determining a shortest path through the network from a source to a destination.

13. An apparatus as recited in claim 11, further comprising:
means for determining whether a graph of the data communications network based on the link state database is disconnected; and
means for determining, if the graph is disconnected, a new shortest path through the network to a destination network element without removing any link that has not been explicitly reported by another network element as failed.

14. An apparatus according to any of claims 11, 12, or 13, further comprising:
means for initiating a timer prior to the accessing step;
means for determining, when the timer expires, a new shortest path through the network to a destination network element.

15. An apparatus for determining network routing information based on shared risk link group information in a data communications network comprising nodes and links, the apparatus comprising:
means for receiving information identifying a failed link in the network;
means for receiving information defining one or more shared risk link groups to which the failed link belongs, each of the one or more shared risk link groups logically comprising two or more links, one of the two or more links being the failed link, and each link in a shared risk link group sharing a physical resource whose failure risks affecting all of the links in the shared risk link group;
determining the set of links S logically comprising all links belonging to the one or more shared risk links groups to which the failed link belongs;
means for adding, during computation of a shortest path first tree, after having added a node X to a path, each neighbor Ni of node X to a tentative tree if and only if a link (X, Ni) does not belong to S.

16. An apparatus for determining network routing information based on shared risk link group information in a data communications network comprising nodes and links, the apparatus comprising:
means for receiving information identifying a failed link in the network;
means for receiving information defining one or more shared risk link groups to which the failed link belongs, each of the one or more shared risk link groups logically comprising two or more links, one of the two or more links being the failed link, and each link in a shared risk link group sharing a physical resource whose failure risks affecting all of the links in the shared risk link group;
means for initiating computation of a shortest path first tree;
means for adding a first node to a path as part of the computation;
means for determining a set of neighbors of the first node; and
means for adding each neighbor node to a tentative tree if and only if a link between the first node and the neighbor node does not belong to one of the shared risk link groups.

17. An apparatus as recited in claim 16, further comprising:
means for determining whether a graph representing the data communications network is disconnected; and
means for determining, if the graph is disconnected, a new shortest path through the network to a destination network element without removing any link that has not been explicitly reported by another network element as failed.

18. An apparatus according to any of claims 16 or 17, further comprising:
means for initiating a timer prior to the accessing step;
means for determining, when the timer expires, a new shortest path through the network to a destination network element.

19. An apparatus for generating routing information in a data communications network having as elements links and nodes, the apparatus comprising:
one or more processors;
a network interface communicatively coupled to the processor and configured to communicate one or more packet flows among the processor and a network; and
a computer readable medium storing one or more sequences of instructions for generating routing information which instructions, when executed by one more processors, cause the one or more processors to perform:
receiving information identifying a failed link in the network;
receiving information defining one or more shared risk link groups to which the failed link belongs,
each of the one or more shared risk link groups logically comprising two or more links, one of the two or more links being the failed link, and each link in a shared risk link group sharing a physical resource whose failure risks affecting all of the links in the shared risk link group;
accessing a link state database that stores information defining one or more links and adjacent nodes;
determining whether each link defined in the link state database is in the one or more shared risk link groups; and
removing an adjacent node from the link state database for a link other than the failed link that is determined to be in one of the shared risk link groups.

20. An apparatus for generating routing information in a data communications network having as elements links and nodes, the apparatus comprising:
one or more processors;
a network interface communicatively coupled to the processor and configured to communicate one or more packet flows among the processor and a network; and
a computer readable medium storing one or more sequences of instructions for generating routing information which instructions, when executed by one more processors, cause the one or more processors to perform
receiving information identifying a failed link in the network;
receiving information defining one or more shared risk link groups to which the failed link belongs,
each of the one or more shared risk link groups logically comprising two or more links, one of the two or more links being the failed link, and each link in a shared risk link group sharing a physical resource whose failure risks affecting all of the links in the shared risk link group;
determining the set of links S logically comprising all links belonging to the one or more shared risk links groups to which the failed link belongs;
during computation of a shortest path first tree, after having added a node X to a path, adding each neighbor Ni of node X to a tentative tree if and only if a link (X, Ni) does not belong to S.

* * * * *